(12) United States Patent
Viala et al.

(10) Patent No.: US 10,092,928 B2
(45) Date of Patent: Oct. 9, 2018

(54) PROCESS FOR THE MANUFACTURE OF A COMPONENT COMPRISING A STACK OF A FUNCTIONAL LAYER ON A COMPOSITE FILM

(71) Applicants: Commissariat a L'Energie Atomique et aux Energies Alternatives, Paris (FR); Centre National de la Recherche Scientifique, Paris (FR); Universite Joseph Fourier, Saint Martin-d'Heres (FR)

(72) Inventors: Bernard Viala, Sassenage (FR); Helene Takacs, Grenoble (FR); Jean-Herve Tortai, La Tronche (FR)

(73) Assignees: Commissariat a L'Energie Atomique et aux Energies Alternatives, Paris (FR); Centre National de la Recherche Scientifique, Paris (FR); Universite Joseph Fourier, Saint Martin d'Heres (FR)

( * ) Notice: Subject to any disclaimer, the term of this patent is extended or adjusted under 35 U.S.C. 154(b) by 70 days.

(21) Appl. No.: 14/957,786

(22) Filed: Dec. 3, 2015

(65) Prior Publication Data
US 2016/0158800 A1 Jun. 9, 2016

(30) Foreign Application Priority Data
Dec. 4, 2014 (FR) ...................................... 14 61939

(51) Int. Cl.
*B05D 3/12* (2006.01)
*B32B 33/00* (2006.01)
(Continued)

(52) U.S. Cl.
CPC ............... *B05D 3/12* (2013.01); *B05D 5/00* (2013.01); *B05D 7/54* (2013.01); *B32B 33/00* (2013.01);
(Continued)

(58) Field of Classification Search
CPC ........................................................ B05D 3/12
(Continued)

(56) References Cited

U.S. PATENT DOCUMENTS 6,653,722 B2 * 11/2003 Blalock .................. B24B 37/30
257/678
7,195,734 B2  3/2007 Heidari
(Continued)

FOREIGN PATENT DOCUMENTS

EP  1 622 437 A1  2/2006
EP  1622437  *  2/2006

OTHER PUBLICATIONS

Takacs, Structural magnetic and dielectric properties of non-conducting nanocomposites for RF applications, 2014, 10th Conference on Ph.D. Research in Microelectronics and Electronics, p. 1-4.*

(Continued)

*Primary Examiner* — Tabatha L Penny
(74) *Attorney, Agent, or Firm* — Oblon, McClelland, Maier & Neustadt, L.L.P.

(57) ABSTRACT

A process of manufacturing component with a composite film including a matrix made of thermoplastic polymer and particles inside this matrix. This process includes heating the composite film in order for its temperature to exceed the glass transition temperature of its matrix, then when the composite film is softened, flattening an external face of the composite film by a smooth face resting directly over the whole of this external face, this smooth face forming part of (Continued)

the front face of a flexible membrane, the whole of the rear face of which, located on the side opposite the front face, is pushed against the composite film by a fluid, then cooling the composite film below the glass transition temperature, then withdrawing the membrane in order to mechanically separate its front face from the external face of the composite film.

8 Claims, 2 Drawing Sheets

(51) Int. Cl.
| | |
|---|---|
| *B32B 37/10* | (2006.01) |
| *B05D 5/00* | (2006.01) |
| *B05D 7/00* | (2006.01) |
| *B29C 70/58* | (2006.01) |
| *B29C 70/88* | (2006.01) |
| *B30B 5/02* | (2006.01) |
| *B32B 37/00* | (2006.01) |
| *B32B 7/02* | (2006.01) |
| *B32B 7/12* | (2006.01) |
| *B32B 27/08* | (2006.01) |
| *B32B 27/18* | (2006.01) |
| *B32B 27/28* | (2006.01) |
| *B32B 27/34* | (2006.01) |
| *B32B 27/36* | (2006.01) |

(52) U.S. Cl.
CPC .............. *B32B 37/10* (2013.01); *B29C 70/58* (2013.01); *B29C 70/88* (2013.01); *B30B 5/02* (2013.01); *B32B 7/02* (2013.01); *B32B 7/12* (2013.01); *B32B 27/08* (2013.01); *B32B 27/18* (2013.01); *B32B 27/286* (2013.01); *B32B 27/288* (2013.01); *B32B 27/34* (2013.01); *B32B 27/36* (2013.01); *B32B 37/0046* (2013.01); *B32B 2255/10* (2013.01); *B32B 2255/20* (2013.01); *B32B 2264/102* (2013.01); *B32B 2264/105* (2013.01); *B32B 2307/202* (2013.01); *B32B 2307/208* (2013.01); *B32B 2307/538* (2013.01); *B32B 2457/00* (2013.01)

(58) Field of Classification Search
USPC ........................................................ 427/355
See application file for complete search history.

(56) References Cited

U.S. PATENT DOCUMENTS

| | | |
|---|---|---|
| 2003/0159608 A1 | 8/2003 | Heidari |
| 2014/0072720 A1 | 3/2014 | Watkins et al. |

OTHER PUBLICATIONS

Liang, Analysis of a Proximity Coupled Patch Antenna on a Metalized Substrate, Antennas and Propagation Society International Symposium 2006, Jul. 9-14, 2006, p. 2287-2290.*

French Preliminary Report and Written Opinion dated Oct. 1, 2015 in Patent Application No. 1461939 (with English Translation of Category of Cited Documents).

H. Takacs et al., "Structural, Magnetic and Dielectric Properties of Non Conducting Nanocomposites for RF Applications", 2014 10th Conference on Ph .D. Research in Microelectronics and Electronics (Prime), XP055216057, Jun. 1, 2014, 4 pages.

"Standard Test Method for Assignment of the Glass Transition Temperatures by Differential Scanning Calorimetry or Differential Thermal Analysis", ASTM Designation: E 1356-98, 1998, 4 pages.

* cited by examiner

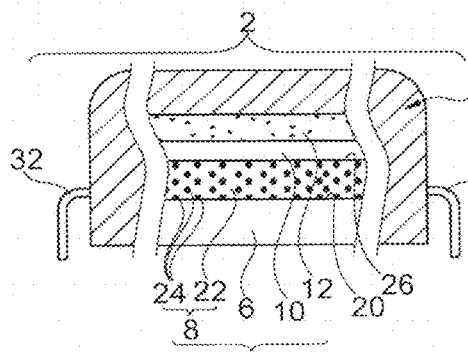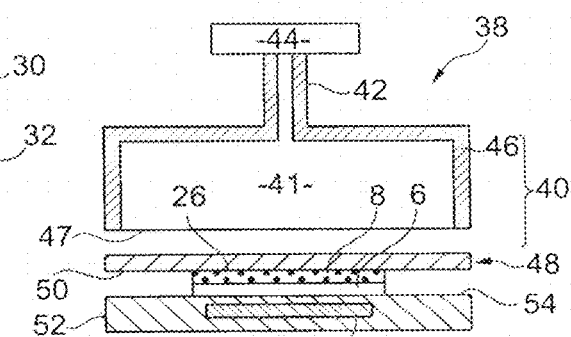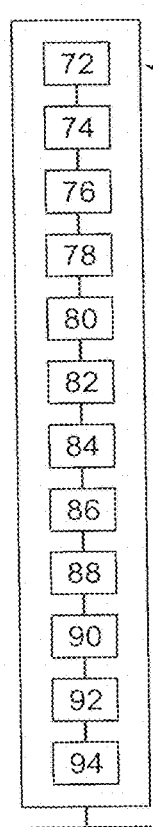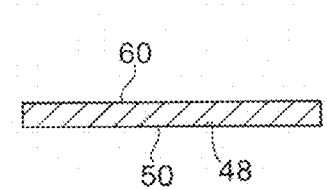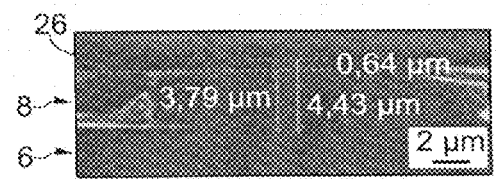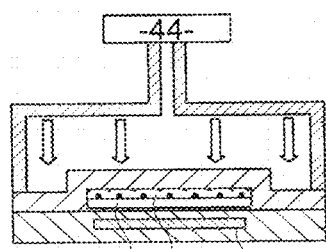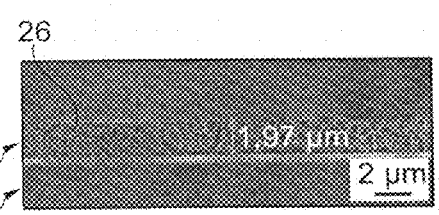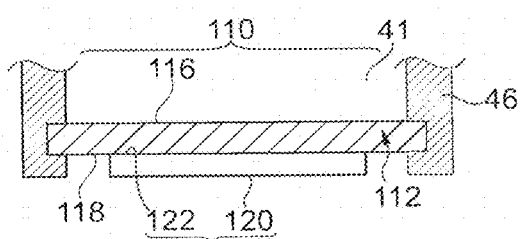

PROCESS FOR THE MANUFACTURE OF A COMPONENT COMPRISING A STACK OF A FUNCTIONAL LAYER ON A COMPOSITE FILM

The invention relates to a process for the manufacture of a component comprising a stack of a functional layer on a composite film. The invention also relates to a device specially designed for the implementation of this manufacturing process.

Typically, a composite film comprises a matrix made of thermoplastic polymer inside which are dispersed particles conferring, on this composite film, physical properties essential to the operation of the component. The exodiameter of the particles is between 1 nm and 100 μm and the volume of the particles inside the composite film represents more than 1% and advantageously more than 10% of the volume of this composite film. Subsequently, the term "nanoparticles" is used when these particles, dispersed inside the matrix, have an exodiameter of between 1 nm and 1 μm.

Known processes for the manufacture of such components comprise:
a) the deposition of the composite film directly on a rigid substrate, the thickness of which is strictly greater than the thickness of the film, the composite film then exhibiting an external face turned the opposite way from the substrate, at this stage, the temperature of the composite film being less than its glass transition temperature, so that this film is referred to as "hard", then
b) the deposition of the functional layer directly on the external face of the composite film.

To date, it has proved to be very difficult to manufacture such a component of good quality with the known processes. This is because, for example, the adhesion of the functional layer to the composite film often proves to be of poor quality and very difficult to carry out. The functional layer deposited on the substrate can also be defective. For example, its resistivity is too high or its density is too low. This results in the preparation of numerous nonfunctional or defective components.

The known state of the art comprises in particular the following paper of the inventors, subsequently referred to as "paper A1": H. Takacs et al., "Structural, magnetic and dielectric properties of nonconducting nanocomposites for RF applications", Microelectronics and Electronics (PRIME), 2014, 10th Conference on Ph.D. Research, IEEE 2014.

EP 1 622 437 A1 is also known from the state of the art.

The invention is targeted at overcoming this disadvantage by providing a process for the manufacture of such a component which limits the number of defective components without excessively complicating the manufacturing process.

A subject-matter of the invention is thus such a manufacturing process in accordance with claim 1.

The Applicants have discovered that a large part of the problems of adhesion and of defectiveness of the functional layer on the composite film originate from the fact that the external face of this composite film is too rough and not flat enough.

They have also found that there did not exist an effective and simple process for planarizing, that is to say for improving the flatness, of the external face of a composite film, such as those used here. More specifically, conventional polishing processes, such as mechanical or physical/chemical polishing, do not work. This is because, in the composite films used, the hardness of the matrix is different from the hardness of the particles. For example, the hardness of the matrix is less than the hardness of the particles. Consequently, the thinning of the composite film does not take place at the same rate in the zones of the external face where particles are flush with the surface as in the zones of the external face where no particle is flush. Thus, the conventional polishing processes do not improve the flatness of the external face, indeed even yet further damage this flatness.

The above process thus makes use of the discovery of the cause of the problems of adhesion and of defectiveness of the functional layer in the composite film. Consequently, in the above process, the flatness of the external face of the composite film is improved before depositing the functional layer. This greatly improves adhesion of this functional layer on the composite film. Components of good quality, each comprising a stack of a functional layer on a composite film, are thus obtained.

In the claimed process, the method for improving the flatness of the external face of the composite film is simple and effective. This is because the fact of using a flexible membrane pushed by a fluid guarantees that the pressure exerted by the membrane on the composite film is uniformly distributed over all of its external face. This also makes it possible to obtain perfect alignment between the external face and the plane of the substrate. These characteristics of the manufacturing process make it possible to reduce even more the roughness of the external face of the composite film and thus to very markedly increase its flatness.

The use of the flexible membrane pushed against the composite film also makes it possible to apply this process even if the surface area of the external face of the composite film is large. "Large" surface area denotes here a surface area at least greater than 50 $cm^2$ or 900 $cm^2$ and which can be greater than 0.3 $m^2$ or 1 $m^2$. Thus, the field of application of this process is very broad.

Finally, after having devised the above process, the Applicants have discovered that the machine necessary in order to flatten the external face of the composite film is similar to the microstamping machine described in Application US2003/0159608. On this subject, the Applicants emphasize that Application US2003/0159608 describes a machine designed to structure a mask used to carry out lithography. More specifically, this patent application describes how to deliberately create impressions and unevennesses in an external face of the mask. Application US2003/0159608 thus describes a machine used for the opposite purpose of that which consists in improving the flatness of an external face. Furthermore, Application US2003/0159608 does not relate to composite films but solely to a resin mask devoid of particles. Under these conditions, a person skilled in the art looking for a process for improving the flatness of the external face of the composite film could not, without an inventive effort, have found this document. Furthermore, before a person skilled in the art starts to look for a process for improving the flatness of the external face of the composite film, it would be necessary for him to know that there was an advantage in doing this. In point of fact, actually, the fact that the defects of flatness of the external face of the composite films are the cause of problems of adhesion and of defectiveness of the functional layer only forms part of the personal knowledge of the inventors and not of the knowledge of a person skilled in the art.

The embodiments of the above manufacturing process can comprise one or more of the characteristics of the dependent claims.

These embodiments of the manufacturing process in addition exhibit the following advantages:

Using a smooth face, the RMS (Root Mean Square) roughness of which is less than the mean exodiameter of the particles, makes it possible to improve the flatness of the composite film.

Using a membrane, the surface area of the front face of which is greater than 20 cm$^2$, makes it possible to apply the above process to composite films of macroscopic dimension.

Using conducting particles encased in a shell made of thermoplastic polymer and a substrate having contiguous conducting and insulating zones makes it possible to produce, simply, a support having a high impedance contrast.

A component obtained from the claimed manufacturing process is also disclosed.

A device for flattening the external face of a composite film, especially intended for the implementation of the above manufacturing process, is also disclosed.

A better understanding of the invention will be obtained on reading the description which will follow, given solely as a nonlimiting example and made with reference to the drawings, in which:

FIG. 1 is a diagrammatic illustration of a component comprising a stack of a functional layer on a composite film;

FIG. 2 is a diagrammatic illustration of a flattening device used to manufacture the component of FIG. 1;

FIG. 3 is a diagrammatic illustration in vertical cross section of a flexible membrane of the device of FIG. 2;

FIG. 4 is a flow diagram of a process for the manufacture of the component of FIG. 1;

FIG. 5 is a photograph, in black and white, of a vertical cross section of a composite film deposited on a substrate before planarization;

FIG. 6 is a diagrammatic illustration of the device of FIG. 2 in an active position, FIG. 7 is a photograph of a vertical cross section of a composite film of the component of FIG. 1 after planarization;

FIG. 8 is a diagrammatic illustration in vertical cross section of another embodiment of the membrane of FIG. 3;

In these figures, the same references are used to denote the same elements. In the continuation of this description, the characteristics and functions well known to a person skilled in the art are not described in detail.

Figure 9:
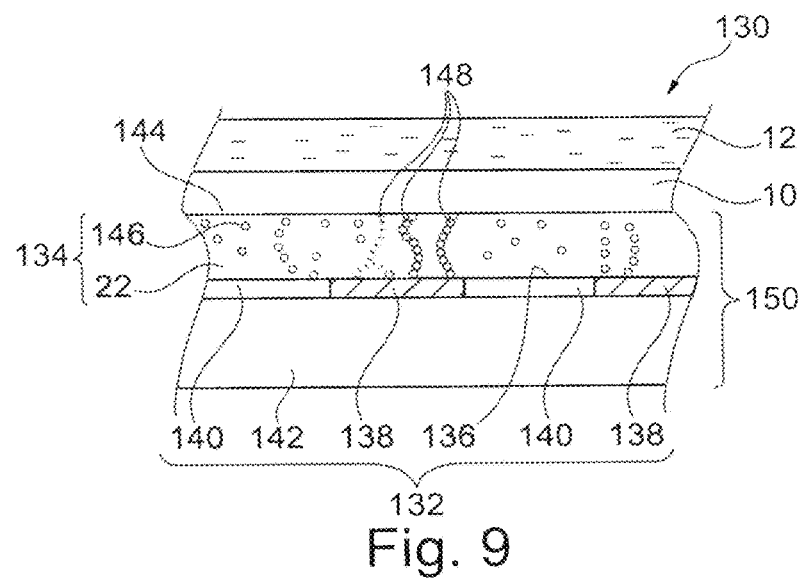
FIGS. 9 and 11 are partial diagrammatic illustrations in vertical cross section of other embodiments of components each comprising a stack of a functional layer on a composite film.

FIG. 1 represents a component 2. This component 2 is a component which captures or which modifies or which emits a physical signal, such as an electromagnetic, optical or electrical signal. The component 2 can also process several of the signals described above. The continuation of this description is done in the specific case where the component 2 is a component which converts an electromagnetic signal into an electrical signal.

Only the characteristics of the component 2 relevant for the description of its manufacturing process are described here. Thus, its graphical representation has been extremely simplified and the factors of scale have not been respected in FIG. 1. Furthermore, in FIG. 1, the vertical wavy lines indicate that parts of the component 2 have not been represented.

The component 2 comprises a stack 4. This stack 4 successively comprises, stacked one above the other, in the vertical direction and going from the bottom towards the top:
a rigid substrate 6,
a composite film 8 directly deposited on the substrate 6,
a functional layer 10 directly deposited on the composite film 8, and
a passivation layer 12 deposited on the functional layer 10.

Subsequently, the terms "upper", "lower", "above", "below", "top" and "bottom" are defined with respect to the stack direction, that is to say the direction perpendicular to the plane in which the substrate 6 mainly extends. In this instance, the stack direction is vertical.

The substrate 6 mainly extends in a horizontal plane. Its thickness is greater than the thickness of the film 8 and generally greater than 10 μm or 20 μm. Its Young's modulus at 20° C. is generally greater than 100 GPa. Furthermore, if the material of the substrate 6 exhibits a glass transition temperature, then the latter is greater by at least 50° C. and preferably more than two or three times greater than that of the matrix of the composite film 8. Likewise, if the material of the substrate 6 exhibits a melting point, the latter is very high, that is to say greater than 200° C. or 350° C.

The substrate 6 exhibits an upper face 20 directly in mechanical contact with the lower face of the film 8. In this instance, this face 20 is flat and horizontal. In this instance, the face 20 is hydrophilic in order to facilitate the adhesion of the film 8 on this face. Preferably, the face 20 is also smooth in order to facilitate the deposition of the film 8. In this description, "smooth" denotes a face, the RMS (Root Mean Square) roughness of which is at least less than 20% or 25% of its thickness and preferably less than 1 μm and, more advantageously still, less than 100 nm or 50 nm or 10 nm. The RMS roughness is measured over a surface area of 100 μm$^2$ or of 1 μm$^2$ using an Atomic Force Microscope (AFM) or a profilometer according to the height of the unevennesses to be measured.

For example, the substrate 6 is a silicon substrate, the upper face 20 of which is composed of a layer of silicon oxide with a thickness of 500 nm.

The film 8 covers the whole of the face 20. It is directly deposited on the face 20. The thickness of the film 8 is typically between 100 nm and 10 μm and preferably between 100 nm and 3 μm. In this instance, the thickness of the film 8 is equal to 2 μm to within plus or minus 20%.

The film 8 comprises a matrix 22 made of polymer material inside which nanoparticles 24 are dispersed. In order to simplify FIG. 1, the reference 24 is shown only for a few of the nanoparticles, represented by black points.

The matrix 22 fills the interstices between the nanoparticles 24 in order to mechanically bind them together. This matrix 22 is made of a thermoplastic polymer material which exhibits a glass transition temperature $T_g$. For example, the temperature $T_g$ is greater than or equal to 30° C. or 50° C. The temperature of the matrix 22 is measured according to the method described in the following document: "Standard Test Method for Assignment of the Glass Transition Temperatures by Differential Scanning calorimetry or Differential Thermal Analysis" (ASTM E 1356-98).

Typically, the matrix 22 is made of an electrically insulating or very weakly conducting and non-magnetic material. "Electrically insulating" denotes, in this description, a material, the electrical resistivity of which at 20° C. is greater than $10^6$ Ω·m or $10^8$ Ω·m or $10^{10}$ Ω·m. "Nonmagnetic" denotes in this instance a material devoid of a measurable magnetic property. In this instance, the matrix 22 is made of polystyrene.

The nanoparticles 24 confer physical properties on the film 8. In the absence of these nanoparticles, the film 8 would be devoid of these physical properties and the component 2 thus would not function. The physical properties in question are typically magnetic, optical, electrical or thermal properties.

In this embodiment, the nanoparticles 24 are particles, the exodiameter of which is greater than 1 nm and preferably greater than 5 nm or 10 nm. The notion of exodiameter is well known in particle size analysis. It is simply restated here that the "Feret diameter" (Df) is the smallest distance between a first given straight line D1 and a second straight line D2 parallel to the straight line D1. These straight lines D1 and D2 are positioned so that all of the orthogonal projection of the particle in the plane containing these two parallel straight lines is between these two parallel straight lines. Furthermore, these two straight lines D1 and D2 each touch, at at least one point, the periphery of this orthogonal projection of the particle. If the straight line D1 is rotated all around the particle, a position of the straight line D1 is found for which the diameter Df is at a maximum. The maximum value of the diameter Df is the exodiameter. The minimum value of the diameter Df is the mesodiameter. The ratio of the maximum surface area of the projection of the particle to the surface area of the circle having a diameter equal to the exodiameter defines what is known as the shape index of the particle. The maximum surface area of the projection of the particle is the surface area of the orthogonal projection of the particle onto a plane, this plane being that which maximizes this surface area.

The exodiameter of the nanoparticles is also strictly less than the thickness of the film 8 and, preferably, at least two or three times less than the thickness of the film 8. Typically, the exodiameter of the nanoparticles is less than 1 µm and generally less than 150 nm. The shape index of the nanoparticles 24 is, for example, between 0.5 and 1.5 and often between 0.8 and 1.2. In this instance, the exodiameter of the nanoparticles 24 is between 20 and 50 nm and, for example, between 20 and 30 nm.

The nanoparticles 24 represent more than 1% and typically more than 10% and advantageously more than 20% or 30% or 50% of the volume of the film 8. The percentage by volume of the nanoparticles 24 in the film 8 can even exceed 90%, depending on the applications envisaged.

In this example, all the nanoparticles 24 are made of the same material. This material is different from that of the matrix 22 in order to confer the desired physical properties on the film 8. For example, the nanoparticles 24 are in this instance made of cobalt in order to confer magnetic properties on the film 8. In this case, the nanoparticles 24 are harder than the matrix 22.

The film 8 exhibits a flat upper face 26 turned towards the top.

The functional layer 10 is necessary for the operation of the component 2 after its manufacture has been completed. It is deposited directly on the face 26. Its thickness is typically between 100 nm and 10 µm and preferably between 100 nm and 3 µm. In this instance, this functional layer 10 is structured in order to form a pattern, such as one or more strands of an inductor or of an antenna, on the face 26. Thus, in this embodiment, it does not cover the whole of the face 26. In this example, the functional layer 10 is a strand made of gold deposited on the film 8.

The layer 12 is, for example directly, deposited on the functional layer 10 in order to passivate it, that is to say to prevent it from reacting with external elements. For example, the layer 12 prevents the layer 10 from oxidizing.

The specific case described here, the stack 4 forms an antenna capable of emitting or receiving electromagnetic waves via the strand made of gold.

The stack 4 is mechanically insulated from the exterior of the component 2 by a protective casing 30 which covers the majority of the faces of the stack 4. In this instance, the protective casing 30 covers the upper face of the stack 4 and, optionally, also all the vertical walls of this stack 4. It is attached without any degree of freedom to the stack 4. For example, it is adhesively bonded to this stack 4.

This casing 30 is made of a material which does not interfere with the operation of the stack 4. In this instance, the casing 30 is made of a non-magnetic and electrically insulating material, such as, for example, an encapsulating resin (epoxy, silicone, varnish). Furthermore, in order to fulfill its protective role, the thickness of the casing 30 is generally fairly large, that is to say greater than or equal to 10 µm or 100 µm.

Finally, the component 2 generally has to communicate or exchange energy with equipment located outside the casing 30. To this end, in this instance, it comprises bonding pads 32 via which it exchanges information and/or energy with this external equipment. These pads 32 are attached without any degree of freedom to the external face of the casing 30. For example, the pads 32 are flush with the external face of the casing 30 or project beyond this casing 30.

When the signal exchanged with the external equipment is an electrical signal, these pads 32 are made of an electrically conducting material. "Electrically conducting" denotes, in this description, a material, the electrical resistivity of which at 20° C. is less than $1.5*10^{-8}$ Ω·m or $10^{-6}$ Ω·m. When the signals exchanged are optical signals, the pads 32 are, for example, made of a material transparent to the wavelengths of the optical signals exchanged.

In this instance, FIG. 1 represents the case where electrical signals are exchanged and the pads 32 are represented in the form of electrical pins. For example, one of these pads 32 is electrically connected to the strand made of gold formed by the layer 10.

The component 2 can comprise other stacks or electronic chips even within the protective casing 30. However, in order to simplify the illustration, these have not been represented.

FIG. 2 represents the architecture of a device 38 for flattening the face 26 of the film 8. This device 38 is structurally similar to those described in Application US2003/0159608. Consequently, only the differences between the device 38 and the devices described in this Application US2003/0159608 are described in detail.

The device 38 comprises a reservoir 40 delimiting an internal cavity 41 capable of containing compressed fluid, such as a gas. The interior of the cavity 41 is connected fluidically via a pipe 42 to a compressor 44.

The reservoir 40 comprises rigid vertical walls 46, the lower edges of which define an opening 47.

The device 38 also comprises a flexible membrane 48 which is mechanically independent of the reservoir 40.

The membrane 48 can be moved, reversibly, between a dismantled position (represented in FIG. 2) and an assembled position (represented in FIG. 6). In the dismantled position, the membrane 48 is mechanically separated from the lower edges of the walls 46, so that it does not close up the opening 47 in leaktight fashion. In this instance, in the dismantled position, a front face 50 of the membrane 48 rests freely directly on the face 26 of the film 8 without compressing it. In the assembled position, the membrane 48 closes up the opening 47 in a way which is leaktight to the compressed fluid. For this, in this embodiment, the whole of the periphery of the membrane 48 is wedged between the lower edges of the reservoir 40 and an upper face 54 of a flat support 52 located facing the opening 47. In this instance, in order to pass between the dismantled and assembled positions, it is the whole of the support 52 which moves in vertical translation between a retracted position (represented in FIG. 2) and an active position (represented in FIG. 6). In the retracted position, the clearance which separates the face 54 from the opening 47 is sufficiently great to allow the introduction and, alternatively, the withdrawal of the stack of the film 8 and of the substrate 6 between this face 54 and the opening 47. In the active position, the face 54 compresses the periphery of the membrane 48 onto the edges of the opening 47 in order to close up this opening in a way which is leaktight to the compressed fluid. When the support 52 is in its active position, the membrane 48 is in its assembled position.

The membrane 48 is described in more detail with reference to FIG. 3. The face 54 also acts as a receiving face, turned towards the opening 47, on which is deposited a stack of the film 8 on the substrate 6. Preferably, this stack is assembled, without any degree of freedom, on the face 54 before the membrane 48 is deposited above, and then dismantled, after the use of the device 38.

The device 38 comprises a heating element 56 capable of heating the film 8 above the temperature $T_g$. In this instance, the heating element 26 is housed, by way of example, inside the support 52 and under the face 54.

FIG. 3 represents the membrane 48. This membrane 48 comprises a rear face 60 which is completely flush with the inside of the cavity 41 in its assembled position. The front face 50 is located on the side opposite the rear face 60. The front face 50 is directly exposed to the outside and rests directly on the face 26.

The thickness of the membrane 48 is chosen to be sufficiently small for, in its assembled position, it to be able to be uniformly deformed when a compressed fluid is received inside the cavity 41. Typically, its thickness is less than 1 mm and advantageously less than 500 μm or 100 μm. It is made of a material which allows it to deform at least in flexion around the points of its periphery wedged between the lower edges of the reservoir 40 and the face 54. Typically, the Young's modulus at 25° C. of the material of the membrane 48 is less than 3 GPa or less than 1 GPa. In this instance, it is made of a polymer material, such as an elastomer.

The surface area of the face 50 is in this instance greater than 20 cm² or 50 cm² and typically greater than or equal to 100 cm² or 500 cm². The surface area of the rear face 60 is equal to the surface area of the face 50.

The face 50 is smooth. In this instance it exhibits a roughness less than or equal to that which it is desired to obtain for the face 26 of the film 8. Generally, the roughness which it is desired to obtain is less than the mean exodiameter of the nanoparticles 24 and preferably two or three or ten times lower than this mean exodiameter of the nanoparticles 24. For example, the RMS roughness of the face 50 is less than 10 μm and generally less than 1 μm and advantageously less than 100 nm or 50 nm or 10 nm.

Whatever the roughness of the face 50, this is created solely by unevennesses randomly distributed over the whole of this face 50. In other words, the face 50 is not structured and does not comprise a pattern, for example a regular pattern, etched into this face 50.

The adhesive force of the face 50 on the face 26 is strictly less than and preferably at least two or three times less than the adhesive force of the film 8 on the substrate 6. This makes it possible not to tear off the film 8 when the membrane 48 is moved from its active position towards its retracted position.

To this end, for example, the face 50 is rendered hydrophobic. For this, the material of the membrane 48 is, for example, a hydrophobic polymer or at least its front face 50 is made of this hydrophobic material. The hydrophobic material is, for example, a material comprising fluorinated organic groups or fluorinated silanes. For example, it can be Teflon, PLLA (Poly-L-Lactide Acid) or PVDF (polyvinylidene fluoride).

The hydrophobic material can also be a composite material composed of a matrix in which hydrophobic particles are dispersed, such as particles of PTFE (polytetrafluoroethylene) dispersed in an NiP matrix.

The face 50 can also be rendered hydrophobic by grafting, for example fluorinated chains, to this face.

In this instance, the whole of the face 50 is hydrophobic.

The manufacture of the component 2 will now be described with reference to the process of FIG. 4 and using FIGS. 5 to 7.

The manufacturing process starts with a phase 70 of producing the stack 4. This phase 70 comprises the deposition 72 of the film 8 on the face 20 of the substrate 6. For this, a liquid solution is prepared which contains the matrix 22 and the nanoparticles 24 in a known proportion by volume which will result in the proportion by volume desired for the preparation of the film 8. For example, a solution is prepared which is mainly composed of the nanoparticles 24, of the thermoplastic polymer of the matrix 22 and of a solvent in which the thermoplastic polymer is dissolved.

Subsequently, in order to deposit the film 8 on the substrate 6, the colloidal solution is distributed over the upper face 20 of the substrate 6. Typically, this is carried out by centrifugal coating, better known as spincoating.

After drying, the film 8 deposited on the substrate 6 is obtained. At this stage, the external face of the film 8 exhibits numerous flatness defects and a high roughness. Typically, at this stage, the RMS roughness of the film 8 is greater than five or ten times the mean exodiameter of the nanoparticles 24.

FIG. 5 represents a photograph of a vertical cross section of the film 8 observed using a scanning electron microscope. In this photograph, it is possible to distinguish an unevenness of approximately 0.64 μm in height. These unevennesses are randomly distributed on the surface of the film 8. It appears that they are caused by clusters of nanoparticles 24 which agglomerate with one another during the preparation of the film 8. Furthermore, the flatness defects in the film 8 are also due to variations in thickness of this film. At this stage of manufacture, differences in thickness of the film 8 between two different locations have been measured which can reach and exceed 1 μm. In this instance, the film 8 thus exhibits an RMS roughness of greater than 1 μm.

Subsequently, during a stage 74, the stack of the film 8 on the substrate 6 prepared above is placed on the face 54 of the support 52 facing the opening 47. Subsequently, the membrane 48 is deposited on the face 26 of the film 8. At this stage, the membrane 48 is held on the face 26 solely by gravity. The membrane 48 is then in its dismantled position.

Likewise, at this stage, the temperature of the film 8 is equal to ambient temperature, that is to say less than 25° C.

During a stage 76, the support 52 is moved from its retracted position towards its active position and, at the same time, the membrane 48 passes from its dismantled position towards its assembled position. The opening 47 is then hermetically closed up by the membrane 48.

During a stage 78, the compressor 44 compresses the fluid present inside the cavity 41 in order to achieve a pressure strictly greater than atmospheric pressure. In this instance, it compresses the gas, for example, to 6 bar (0.6 MPa). The membrane 48 then deforms and completely matches the shape of the film 8 (FIG. 6). In this FIG. 6, the vertical arrows inside the cavity 41 represent the pressure which is exerted on the rear face 60 of the membrane 48 and thus on the upper face 26. This pressure is uniformly distributed over the whole of the face 26, this being the case whatever its surface area, as it is exerted via a fluid.

During a stage 80, the heating element 56 is controlled in order to heat the film 8 above the temperature $T_g$ while remaining below its melting point. The heating temperature also remains lower than the glass transition temperature of the other materials used in the device 38, such as those used for the substrate 6 or the membrane 48. In response to this heating, the film 8 softens. For example, the heating temperature is taken equal to 120° C. and is maintained for 1 min.

During a stage 82, once the film 8 has softened, the compressor 44 increases the pressure of the fluid present inside the cavity 41 while maintaining the film 8 above its temperature $T_g$. For example, during stage 82, the pressure inside the cavity 41 changes to 40 bar (4 MPa). This pressure is maintained for 5 min. Thus, during stage 82, the face 50 of the membrane is flattened against the face 26 of the film 8.

During a stage 84, the heating element 56 is controlled in order to bring the temperature of the film 8 back below the temperature $T_g$. For example, the heating element 56 is switched off. Consequently, the film 8 hardens again as soon as its temperature has fallen below the temperature $T_g$.

During a stage 86, once the temperature of the film 8 has fallen below the temperature $T_g$, the compressor 44 brings the pressure inside the cavity 41 down until it has returned to atmospheric pressure.

During a stage 88, once the pressure of the gas inside the cavity 41 has again become equal to atmospheric pressure, the support 52 is moved towards its retracted position, which at the same time moves the membrane 48 towards its dismantled position. Subsequently, the stack of the film 8 on the substrate 6 is withdrawn from the support 52. The membrane 48 is then withdrawn, for example manually, which separates the face 50 from the face 26 of the film 8.

At this stage, the flatness of the face 26 of the film 8 is considerably improved. For example, the roughness of the face 26 is less than or equal to 100 nm or 50 nm. This is represented in the photograph of FIG. 7. This photograph is a vertical cross section of the film 8 observed using a scanning electron microscope. This photograph illustrates the case where the RMS roughness of the face 26 obtained is less than 100 nm.

Subsequently, the process for preparing the stack 4 is continued by:
- the deposition, during a stage 90, of the functional layer 10 directly on the face 26 of the film 8,
- the structuring, during a stage 92, of the deposited functional layer 10 in order to form the strand of the antenna, then
- the deposition, during a stage 94, of the passivation layer 12 on the structured functional layer 10.

Stages 90 and 92 are carried out according to processes conventional in microtechnology for the deposition and/or structuring of layers. For example, the deposition is carried out by sputtering or electrodeposition. The structuring is then carried out by dry or wet etching. Stages 90 and 92 can also be carried out using inkjet printing, which projects the layer 10 solely at the desired locations on the face 26. In this case, the deposition and structuring of the layer 10 take place at the same time.

Despite the use of a conventional process for the deposition of the functional layer 10, the latter adheres very well to the face 26 of the film 8 and gives properties suitable for the operation of the component 2 (for example a low electrical resistivity) as the flatness of this face is very good at that stage.

The phase of preparing the stack 4 is then complete.

This phase 70 can be followed by one or more phases 100 of preparing other stacks, such as the stack 4, or one or more electronic chips.

Subsequently, the process is continued by phase 102 of producing bonding pads 32 and of electrical connection of these pads. Finally, on conclusion of the phase 102, during a phase 104, the protective casing 30 is produced. For example, the casing 30 is produced by moulding a thermosetting polymer.

FIG. 8 represents a membrane 110 capable of being used in place of the membrane 48. The membrane 110 comprises a flexible sheet 112 and a stamp 114. In this embodiment, the periphery of the sheet 112 is anchored, without any degree of freedom, to the lower edge of the wall 46. The sheet 112 is flexible. For example, for this, it is made of a material such as one of those described above for the membrane 48. This sheet 112 exhibits a rear face 116 which is flush directly with the inside of the cavity 41. The face 116 corresponds to the rear face of the membrane 110. This sheet 112 also exhibits a front face 118 directly exposed to the exterior. This face 118 is partly covered with the stamp 114 so that it is directly exposed to the exterior only all around the stamp 114. Thus, the external face 118 directly exposed to the exterior forms a border of polymer material around the stamp 114. This border can have any shape. For example, the internal periphery of this border is square if the external periphery of the stamp is square.

The stamp 114 comprises a front face 120 and a rear face 122. These faces 120 and 122 are parallel and are each located on an opposite side. The face 122 is completely and directly in contact, without any degree of freedom, with the front face 118 of the sheet 112. To this end, the face 122 is, for example, adhesively bonded to the face 118.

Only the front face 120 is intended to come directly into contact with the face 26 during the execution of the process of FIG. 4. To this end, the face 120 is smooth. For example, it is at least as smooth as the face 50 described above. Conversely, the face 118 does not need to be smooth in this embodiment.

The adhesive force between the face 120 and the face 26 of the film 8 is less than the adhesive force of this film 8 on the substrate 6. To this end, that which is described for the face 50 applies to the face 120. The stamp 114 makes it possible to choose a smooth material which does not adhere to the film 8 independently of that used for the sheet 112. It will also be pointed out that the circumference of the face 118 directly exposed to the exterior does not need to be subjected to the same treatments as the face 120 in order to reduce its adhesive force on the film 8.

The stamp 114 may or may not be made of a rigid material. For example, the stamp 114 is made of silicon. Its thickness is then greater than 50 μm, for example greater than 500 μm or 750 μm.

The process for the manufacture of the component 2 with the membrane 110 is the same as that of FIG. 4, except that, when the support 52 moves towards its retracted position, this at the same time brings about the separation of the faces 26 and 120 as the membrane 110 remains assembled on the reservoir 40.

FIG. 9 represents a component 130. This component is identical to the component 2 except that the rigid substrate 6 is replaced with a rigid substrate 132 and the composite film 8 is replaced with a composite film 134. In order to simplify FIG. 9, the casing 30 and the pads 32 have not been represented.

The substrate 132 is identical to the substrate 6, except that its upper face 136 directly in contact with the composite film 134 is not completely composed of a uniform layer of silicon oxide but, to the contrary, comprises several conducting zones 138. In the plane of the face 136, these conducting zones 138 are mechanically separated and electrically insulated from one another by insulating zones 140. The zones 140 are interposed between the zones 138. Generally, each conducting zone 138 is completely surrounded by an insulating zone 140. Furthermore, in this embodiment, the conducting zones 138 are periodically distributed over the face 136. For example, this distribution exhibits a periodicity in at least one horizontal direction and more often in at least two non-colinear horizontal directions. For example, the zones 138 form a chess pattern.

Each zone 138 is made of an electrically conducting material. For example, each zone 138 is formed of a metal dot deposited on a flat upper face of a layer 142 which extends horizontally under the whole of the composite film 134. For example, the layer 142 is made of a semiconducting material, such as silicon. The thickness of the metal dots is typically less than a tenth of the thickness of the layer 142. For example, the thickness of the metal dots is less than or equal to 500 nm.

Preferably, the conducting zones 138 are made of non-oxidizable metal. For example, they are made of a noble metal and advantageously of platinum or of gold. In this instance, the zones 138 are made of platinum.

The zones 140 are made of an electrically insulating material. In this instance, these zones 140 are dots or strips interposed between the zones 138 and of the same thickness as these zones 138. The zones 140 are, for example, made of silicon oxide.

The film 134 exhibits an external face 144 on which the functional layer 10 is directly deposited. The film 134 is identical to the film 8, except that the nanoparticles 24 are replaced with nanoparticles 146. The width and the length of the film 134 in a horizontal plane are greater than 10 or 100 times its thickness. Width and length of the film 134 denote in this instance the width and the length of the horizontal rectangle of smallest surface area completely containing the film 134.

The nanoparticles 146 are made of an electrically conducting material. Furthermore, preferably, the nanoparticles are also made of a material having a magnetic permeability, the real part of which at 10 GHz is strictly greater than 1 and preferably greater than 2 or 5. If the nanoparticles 146 are made of a metal which oxidizes, they are then each advantageously coated with a nonoxidizable material, such as graphene. This makes it possible to prevent these nanoparticles 146 from oxidizing. In this instance, the nanoparticles 146 are made of cobalt and are housed inside a shell made of graphene. Further details on how to obtain such nanoparticles are given in Chapter II.A of the paper A1.

The exodiameter of the nanoparticles 146 is less than a third of the thickness of the film 134 and preferably less than a tenth of this thickness. Conversely, their exodiameter is generally greater than a one hundredth and preferably than a fiftieth of the thickness of the film 134.

In this embodiment, the nanoparticles 146 represent more than 10% of the volume of the film 134 and preferably more than 30%, 40% or 50% of this volume. In this instance, the nanoparticles 146 represent between 50% and 70% of the volume of the film 134. Generally, the volume of the nanoparticles 146 in the film 134 remains less than 90% of the volume of this film.

In each region of the film 134 located above a conducting zone 138, the nanoparticles 146 form chains of nanoparticles which electrically connect the external face 144 of the film 134 to this conducting zone 138. In order to simplify FIG. 9, only a few vertical chains 148 have been diagrammatically represented. Each chain of nanoparticles is formed of several nanoparticles directly in mechanical contact with at least one other nanoparticle of the same chain. In this instance, the vertical chains 148 extend from the face 144 as far as the face 136. Thus, each of these chains forms an electrically conducting pathway through the thickness of the film 134.

On the other hand, the film 134 is devoid of a horizontal chain of nanoparticles horizontally traversing right through the film 134. "Devoid" denotes the fact that, if horizontal chains exist, then the latter are very rare and contain less than 0.5% and typically less than 0.1% of the nanoparticles of the film 134.

The film 134 thus exhibits an anisotropic electrical conductivity. It is electrically conducting in the vertical direction in the regions located above the zones 138 and is electrically insulating in all the horizontal directions.

The stack of the film 134 directly on the substrate 132 thus forms a support 150 having a high impedance contrast. A support having a high impedance contrast is a support exhibiting regions having high electrical impedance immediately contiguous with regions of low electrical impedance. In this instance, the regions having low electrical impedance are the regions of the film 134 located immediately above the conducting regions 138 and the regions having a high impedance are the regions of the film 134 located immediately above the insulating zones 140. This support 150 exhibits the advantage of being very insensitive to the skin effect and thus of retaining a high contrast between the regions of high and low electrical impedance, even for high operating frequencies, that is to say greater than or equal to 1 GHz. Conversely, a conventional support having a high impedance contrast produced as described for the support 150 but replacing the nanoparticles 146 with vertical metallized pads or vias which connect the external face 144 to each conducting zone 138 does not exhibit such an advantage. This is because vertical vias typically have a diameter of greater than 10 μm. Consequently, the higher the frequency, the less the electrons located at the core of the via participate in the electrical conduction and only the electrons located in the skin thickness on the periphery of the vias participate therein. Consequently, the electrical resistance of the vias increases as the operating frequency increases. This resistance can even become virtually infinite for high frequencies. This increase in electrical resistance of the regions of low impedance reduces the impedance contrast between the different regions. The Applicant explains the absence of this problem in the substrate 150 by the fact that the electrical conductivity between the face 144 and the conducting zones 138 is provided by a multitude of chains 148 connected in parallel between this face 144 and the conducting zones 138. In point of fact, each chain 148 forms a very narrow pathway for the passage of electricity which is narrower than the skin thickness at 1 GHz. Consequently, the electrical resistivity of the zones having low impedance of the substrate 150 does not change even if the operating frequency reaches 1 GHz.

Such supports having a high impedance contrast are capable of numerous industrial applications, in particular in electromagnetism and in optics. For example, these supports are used to support antennae.

The process for the manufacture of the component 130 will now be described using the process of FIG. 10. This process begins with a stage 160 of coating each nanoparticle 146 with a shell made of thermoplastic polymer. This stage 160 is carried out as described in Chapter II.B of the paper A1.

In parallel, during a stage 162, the substrate 132 is manufactured. This stage 162 comprises in particular the preparation of the conducting zones 138 and the insulating zones 140 of the face 136. These different zones are prepared by employing conventional processes for deposition and etching in microelectronics. For example, the upper face of the layer 140 is oxidized in order to create a layer of silicon oxide. Subsequently, the layer of silicon oxide is etched in order to form cavities at the sites where the metal dots have to be produced. Finally, platinum is deposited inside these cavities and the upper face is polished until the face 136 is obtained.

Subsequently, the process is continued by phase 164 of producing the support 150 and the component 130. The phase 164 is identical to the phase 70, expect that the substrate 6 is replaced with the substrate 132 and the nanoparticles 24 are replaced with the nanoparticles 146. Consequently, this phase 164 is not described in detail and only the following points are emphasized.

During stage 72, it is the nanoparticles 146 each coated with its shell made of thermoplastic polymer which are dispersed inside the matrix 22. At that stage, the polymer shell prevents the nanoparticles 146 from coming directly into electrical contact with one another, this being the case even if the concentration of nanoparticles 146 is high inside the film 134. Thus, on conclusion of stage 72, the film 134 is not electrically conducting either in the horizontal direction or in the vertical direction. In particular, the film 134 is not conducting even above the conducting zones 138. This is explained by the fact that, in that stage, the polymer shell of the nanoparticles prevents the appearance of the chains 148.

During stage 80, the heating element 56 heats the matrix 22 and the shells made of thermoplastic polymer above their respective glass transition temperatures in order to soften them both.

Stage 82 is subsequently carried out when both the matrix 22 and the polymer shells are softened. The Applicant considers that it is because of this that the chains 148 are formed during this stage 82.

On conclusion of stage 88, in addition to the very low roughness of the face 144, the support 150 exhibits regions with very high impedance contrasts.

Subsequently, on conclusion of phase 164, the process is continued with stages 100, 102 and 104. In order to simplify FIG. 10, these stages have not been represented.

The section located to the right of FIG. 4 in the paper A1 indicates that the vertical conductivity of a film produced by following a similar process to that described above and interposed between lower and upper electrodes is actually greater than that of a polystyrene film without nanoparticles ($10^{-6}$ S/m versus $10^{-10}$ S/m) but remains very low in this instance. This is erroneous. This result was explained a posteriori because, in the paper A1, the lower electrode was composed of the silicon of the substrate (not oxidized at the surface) and not of a metal layer, such as platinum. The inventors noticed, after the publication of the paper A1, that, in reality, the conductivity of such a composite film interposed between a lower electrode made of platinum and an upper electrode made of gold was, on the contrary, very good and, for example, greater than 10 S/m. Under the same conditions as those of the paper A1, a vertical conductivity of greater than 1 S/m was measured in the regions located above the zones 138. Preferably, the vertical conductivity in the regions above the zones 138 is greater than 10 S/m and advantageously greater than $10^3$ S/m.

Figure 11:
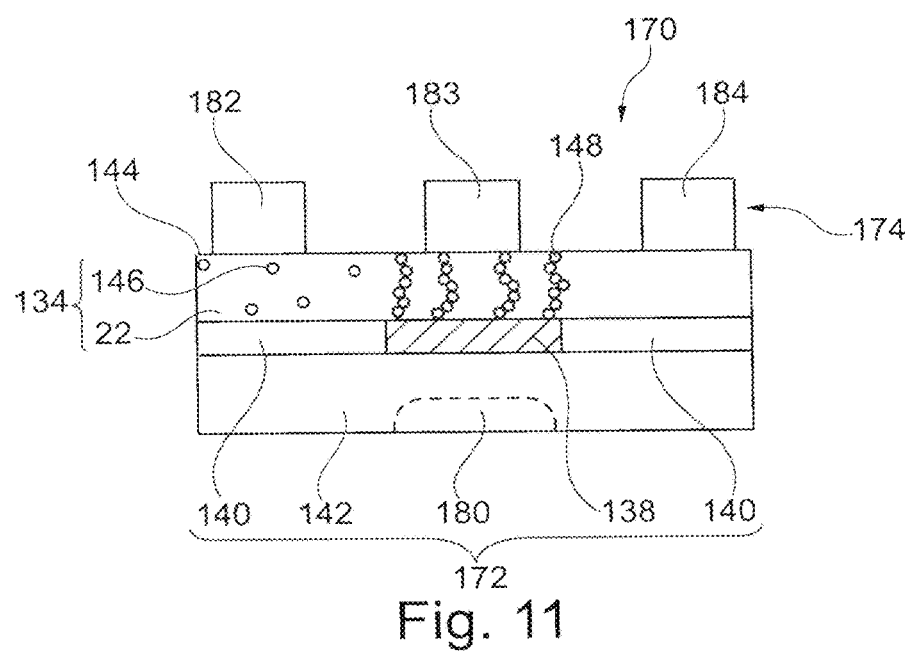

FIG. 11 represents a component 170. This component 170 is identical to the component 130, except that the substrate 132 is replaced with a substrate 172 and that the functional layer 10 is replaced with a functional layer 174. In order to simplify FIG. 11, the passivation layer 12, the casing 30 and the pads 32 have not been represented in this figure.

The substrate 172 is identical to the substrate 132, except that electrical devices, such as transistors, are produced in the layer 142. These electrical devices are, for example, CMOS (Complementary Metal Oxide Semiconductor) components. At least some of these electrical devices are electrically connected to the conducting zone 138 below which they lie. In this instance, only one such device 180 located below the conducting zone 138 is represented.

The functional layer 174 also comprises several electronic devices. These electronic devices are, for example, chosen from the group consisting of an inductor, an antenna, a capacitor and a resistance. In this instance, three electronic devices 182 to 184 are represented. The devices 182 and 184 are positioned solely above respective insulating zones 140. The electronic device 183 is positioned solely above the conducting zone 138.

In the component 170, the conducting region of the film 134 located above the zone 138 is used to electrically connect the device 183 to the device produced on or in the layer 140. At the same time, the insulating regions of this same film 134 located above the zones 140 are used to electrically insulate the devices 182 and 184 from the device 180. The fact of using the chains 148 to establish electrical connections between the devices 183 and 180 exhibits the same advantages as those described with reference to FIG. 9. In particular, such an electrical connection is insensitive to the skin effect even at frequencies of greater than or equal to 1 GHz.

Figure 10:
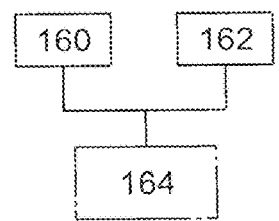
FIG. 10 is a flow diagram of a process for the manufacture of the component of FIG. 9.

The process for the manufacture of the component 170 is deduced from the manufacturing process of FIG. 10. It will thus not be described in this instance in detail.

Numerous other embodiments are possible. For example, the upper face 20 of the substrate 6 is not necessarily smooth. In an alternative form, it is structured. In this description, "structured face" denotes in this instance the fact that patterns, such as grooves or holes, are etched into this face at predetermined locations. The depth of these patterns is greater than 10 nm or 50 nm and typically greater than 1 μm or 20 μm. For example, before depositing the film 8, grooves or holes are etched in this face 20. The depth of these grooves or these holes is typically greater than 1 μm or 20 μm.

The substrate 6 can be made of other materials than silicon oxidized at the surface. For example, its face 20 can be made of $TiO_2$ or of AlN or of Pt. The material used for the body of the substrate 6 can be a monocrystalline inorganic material or a ceramic. It can also be a metal substrate covered with a hydrophilic coating. This hydrophilic coating can be a non-organic coating, such as a coating of metal oxide and nitride, of conducting or semiconducting oxide, or any metal preferably weakly oxidizable. It can, for example, be gold, platinum, silicon, silicon oxide, silicon nitride, aluminium nitride, ITO (indium tin oxide), AZO, and the like. This coating can also be an organic coating produced from a hydrophilic polymer of metal hydroxides and of amines. For example, its general formula can be $M(OH)_x$ with M chosen from the group consisting of Be, Mg, Ca, Sr, In, Ba, Ra, Al, Zn, Y and polydopamines and index "x" is typically an integer greater than one.

Finally, the substrate 6 can also be made of a non-thermoplastic polymer material or of a thermoplastic material having a glass transition temperature much greater than that of the film 8 and also having a very high melting point, that is to say greater than 200° C. For example, it can be Kapton, PET (Polyethylene Terephthalate), PEN (Polyethylene Naphthalate), PI (Polyimide), PSF (Polysulphone), PPS (Polyphenylene Sulphide), PEEK (Polyetheretherketone), PA (Polyamide), PAI (Polyamide-Imide) and other similar polymers. On the other hand, fluoropolymers, such as Teflon, are to be avoided as they are hydrophobic, which limits the adhesion of the film 8 to the substrate 6.

The film 8 can contain a mixture of different nanoparticles. These different nanoparticles differ from one another, for example, in their chemical composition. That which has been described for the nanoparticles 24 then applies to each of these types of nanoparticles.

In an alternative form, the film 8 is structured and does not cover the whole of the face 20. For example, the film 8 is cut by photolithography or deposited so as to cover only a portion of the face 20. In this case, before stage 90, it is possible to add a stage of structuring the film 8. The cutting of the film 8 can also be carried out by tearing off localized zones of the film 8. The tearing off consists in exerting, in localized zones on the film 8, a tensile force greater than the adhesive force between this localized zone and the substrate 6.

The functional layer 10 can be any element necessary for the operation of the component 2. For example, the layer 10 can be structured in order to form an electrical connection between different parts of the component 2.

In an alternative form, the functional layer 10 is not structured. In this case, it covers the whole of the face 26 of the film 8. This layer 10 can also be made of many different materials chosen as a function of their physical property. For example, if the layer 10 has to be made of a material which is a good conductor of electricity, it can then be made of metal. The layer 10 can also be made of other materials having other properties, such as a piezoelectric material, an electrocaloric material or a ferromagnetic material. The layer 10 can also be a composite film, that is to say can comprise a matrix within which nanoparticles are dispersed. For example, the layer 10 is a composite film having the same characteristics as those described for the film 8.

The protective casing 30 can completely encase the sack 4, that is to say cover its upper and lower faces, and also its vertical walls. Depending on the function of the stack 4, the protective casing can be made of other materials. For example, it can be made of metal, if the operation of the stack 4 is possible inside such a protective casing made of metal. In a simplified alternative form, the casing 30 is omitted.

All the embodiments described in Application US2003/0159608 can be adapted to the process of FIG. 4. The adaptation then consists in replacing the membrane and the stamp described in this Application US2003/0159608 with one of the membranes described above. For example, instead of moving the support 52 between the retracted and active positions, it is the reservoir 40 which is moved between these retracted and active positions.

In another embodiment, the pressure of the membrane 48 on the face 26 of the film 8 is obtained by creating a negative pressure between these two faces, instead of by increasing the pressure inside the cavity 41. In this embodiment, the fluid inside the cavity 41 is not compressed. In another alternative form of the device 38, the fluid used to push the membrane 48 is not a gas but a liquid.

The membrane 48 can be arranged on the lower edges of the walls 46, as described for the membrane 110. Conversely, the membrane 110 can be used as described in the case of the membrane 48. In the latter case, the membrane 110 is not attached, without any degree of freedom, to the reservoir 40.

The membrane 48 can be made of metal; in this case, the membrane 48 is a thin sheet of metal, the thickness of which is typically less than 500 μm or 300 μm or 100 p.m.

For certain large-dimension applications, the surface area of the front face 50 can exceed 1 $m^2$ or 2 $m^2$. All which was described above still applies.

The membrane 110 can comprise several buffers 114 separated mechanically from one another and attached to the same sheet 112. These buffers can be much smaller than the sheet 112.

Several different intermediate layers can be deposited between the functional layer 10 and the passivation layer 12. One or more of these intermediate layers can be composite films similar to the film 8. In this case, these additional composite films are deposited as described for the film 8.

In an alternative form, stage 92 of structuring the functional layer 10 is omitted.

In another alternative form, after stage 92 or after stage 94 or after another subsequent stage of manufacture of the component 2, the process comprises a stage of cutting the stack 4 into several pieces mechanically independent of one another. Each of these pieces is then incorporated in a respective component 2 mechanically independent of the others. It is then said that it is a collective process for the manufacture of these different stack pieces each comprising a composite film deposited on a substrate.

Passing through an intermediate pressure before applying a higher pressure can be omitted. This is in particular the case if the final pressure used to flatten the face 26 is less than 10 bar (1 MPa). The pressure used to flatten the face 26 is strictly greater than 1 bar and generally greater than 6, 10 or 30 bar. It is also generally less than 500 bar.

It is also possible to begin to heat the film 8 before bringing the front face 50 of the membrane 48 into contact with the face 26 of the film 8.

If the film 8 exhibits strong differences in thickness on conclusion of stage 72, it is possible to repeat stages 74 to 88 several times on the face 26 of the same film 8 with the same membrane 48 or, on the other hand, by using different membranes during each iteration of the stages 74 to 88. For example, during a first iteration of stages 74 to 88, a first membrane is used. This first membrane is sturdier than those which will be used subsequently and exhibits, for example, a rougher front face than those of the other membranes used. In this case, this first membrane is used in particular to make up for the differences in thickness of the film 8. Subsequently, during a second iteration of stages 74 to 88, a second membrane is used. This second membrane exhibits a markedly less rough front face than the front face of the first membrane. In this case, the second iteration of stages 74 to 88 makes it possible in particular to decrease the roughness of the face 26.

In an alternative form, the nanoparticles 146 are made of electrically conducting material having a magnetic permeability, the real part of which at 10 GHz is equal to 1.

Other metals than platinum can be used to produce the conducting zones 138. For example, gold is also a good candidate.

The conducting zones 138 can also be produced differently. For example, these zones can be produced by implantation of ions or localized doping of the upper face of the layer 142.

The insulating zones 140 can be made of other electrically insulating materials. For example, they can be made of $Si_3N_4$.

In order to manufacture a support having a high impedance contrast, it is not necessary for the front face of the membrane 48 or of the stamp 114 to be smooth. On the contrary, in an alternative form, the front face of the membrane or of the stamp is structured. Under these conditions, during stage 82, the membrane or the stamp prints in relief the patterns etched in the face 144. In other words, the face of the composite film on which the functional layer is deposited is structured instead of being smooth, that is to say that at least one relief is printed by stamping in this face of the film.

The embodiments described until now have been described in the specific case of composite films comprising only nanoparticles. However, everything which has been described also applies to composite films in which the particles dispersed inside the matrix have an exodiameter which can reach up to 10 μm or 30 μm or 100 p.m. In this case, the thickness of the film is adapted in order for it to be strictly greater and preferably two or three times greater than the exodiameter of the largest particles of this film. When the exodiameter $ED_{max}$ of the largest particles exceeds 1 μm or 10 μm, it can be advantageous to keep the exodiameter of the smaller particles greater than $ED_{max}/100$ or $ED_{max}/10$ in order to limit the extent of the distribution in the sizes of the particles.

The invention claimed is:

1. A process of manufacturing a component that includes a stack of a functional layer on a composite film, the composite film includes a matrix made of thermoplastic polymer inside which are dispersed particles conferring physical properties on the composite film, the exodiameter of the particles being between 1 nm and 100 μm and the volume of the particles inside the composite film representing more than 1% of the volume of this composite film, said process comprising:
   a) depositing the composite film directly on a rigid substrate, a thickness of said rigid substrate is strictly greater than the thickness of the film, the composite film then exhibiting an external face turned an opposite way from the substrate, after depositing the composite film the temperature of the composite film being less than its glass transition temperature, then
   b) depositing the functional layer directly on the external face of the composite film, wherein, between steps a) and b), the process comprises:
      1) heating the composite film in order for its temperature to exceed the glass transition temperature of its matrix, so as to soften it,
      2) when the composite film is softened, flattening the external face of the composite film by a smooth face resting directly over the whole of this external face, said smooth face forming part of the front face of a flexible membrane, the whole of the rear face of which, located on the side opposite the front face, is pushed against the composite film by a fluid, then
      3) cooling the composite film below the glass transition temperature in order to again harden the composite film, then
      4) withdrawing the membrane in order to mechanically separate its front face from the external face of the composite film.

2. The process according to claim 1, in which the process comprises, after steps a) and b), preparing a protective casing around the stack in order to protect said stack from the external environment.

3. The process according to claim 1, in which, during step 2), the smooth face exhibits only unevennesses randomly distributed over the whole of its surface and the RMS (Root Mean Square) roughness of this smooth face is strictly less than the mean exodiameter of the particles dispersed in the composite film.

4. The process according to claim 3, in which, during step 2), the RMS roughness of the smooth face is less than 100 nm.

5. The process according to claim 3, in which, during step 2), the RMS roughness of the smooth face is less than 10 nm.

6. The process according to claim 1, in which the front face of the flexible membrane is strictly greater than 20 cm$^2$.

7. The process according to claim 1, in which the process comprises structuring the functional layer in order to give the functional layer a predefined shape so that the structured functional layer then covers only a portion of the external face of the composite film.

8. The process according to claim 1, in which:
   before step a), the process comprises:
   producing at least one conducting zone and of at least one insulating zone on the face of the rigid substrate on which the composite film is deposited during step a), each conducting zone being made of an electrically conducting material and each insulating zone being made of an electrically insulating material, and
   providing conducting particles, each conducting particle being made of electrically conducting material and exhibiting an exodiameter less than one third of the thickness of the film after this film has been flattened during said flattening, and the shape index of each conducting particle is between 0.5 and 1.5 and each conducting particle is coated with its own shell made of the, thermoplastic polymer,
   during step a), the composite film deposited comprises between 10% and 90% by volume of conducting particles, each particle being electrically insulated from the other conducting particles by said shell made of thermoplastic polymer, and
   during said heating, the composite film is heated above the glass transition temperatures of its matrix and of the shell of the particles in order to soften both the composite film and the shell of the particles.

* * * * *

UNITED STATES PATENT AND TRADEMARK OFFICE
CERTIFICATE OF CORRECTION

PATENT NO. : 10,092,928 B2
APPLICATION NO. : 14/957786
DATED : October 9, 2018
INVENTOR(S) : Bernard Viala et al.

Page 1 of 1

It is certified that error appears in the above-identified patent and that said Letters Patent is hereby corrected as shown below:

In the Claims

Column 18, Line 60 of Claim 8, delete "the," before "thermoplastic".

Signed and Sealed this
Fourth Day of June, 2019

Andrei Iancu
*Director of the United States Patent and Trademark Office*